United States Patent
Gong et al.

(10) Patent No.: US 11,093,388 B2
(45) Date of Patent: Aug. 17, 2021

(54) METHOD, APPARATUS, DEVICE AND STORAGE MEDIUM FOR ACCESSING STATIC RANDOM ACCESS MEMORY

(71) Applicant: BEIJING BAIDU NETCOM SCIENCE AND TECHNOLOGY CO., LTD., Beijing (CN)

(72) Inventors: Xiaozhang Gong, Beijing (CN); Jing Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/682,868

(22) Filed: Nov. 13, 2019

(65) Prior Publication Data

US 2020/0159658 A1 May 21, 2020

(30) Foreign Application Priority Data

Nov. 21, 2018 (CN) .......................... 201811390740

(51) Int. Cl.
*G06F 12/06* (2006.01)

(52) U.S. Cl.
CPC .. *G06F 12/0607* (2013.01); *G06F 2212/1016* (2013.01)

(58) Field of Classification Search
CPC ......... G06F 12/0607; G06F 2212/1016; G06F 13/4031; G06F 2212/1024; G06F 13/1647;
(Continued)

(56) References Cited

U.S. PATENT DOCUMENTS 5,559,986 A * 9/1996 Alpert ................. G06F 12/0851
711/144
9,405,480 B2 * 8/2016 Chen ...................... G06F 3/0619
(Continued)

FOREIGN PATENT DOCUMENTS

CN 104183267 A 12/2014
CN 106055516 A 10/2016
(Continued)

OTHER PUBLICATIONS

European Search Report for Application No. 19210088.1, dated Apr. 20, 2020, 9 pages.
(Continued)

*Primary Examiner* — Fernando Hidalgo
(74) *Attorney, Agent, or Firm* — Fay Sharpe LLP

(57) ABSTRACT

The present disclosure relates to a method, an apparatus, an electronic device and a computer readable storage medium for accessing static random access memories. The method includes: receiving an access request for data associated with the static random access memories; writing a plurality of sections of the data into a plurality of different static random access memories in an interleaved manner in response to the access request being a write request for the data, each of the plurality of sections having its respective predetermined size; and reading the plurality of sections of the data from the plurality of static random access memories in an interleaved manner in response to the access request being a read request for the data, each of the plurality of sections having its respective predetermined size.

18 Claims, 6 Drawing Sheets

(58) Field of Classification Search
CPC ... G06F 13/1615; G06F 13/1621; G06F 13/18
USPC .......................................................... 711/104
See application file for complete search history.

(56) References Cited

U.S. PATENT DOCUMENTS

| | | |
|---|---|---|
| 9,697,118 B1 | 7/2017 | Singh et al. |
| 2010/0287332 A1* | 11/2010 | Koshiyama ......... G06F 12/0607 711/103 |
| 2015/0149716 A1 | 5/2015 | Hagspiel et al. |
| 2017/0168934 A1 | 6/2017 | Singh et al. |

FOREIGN PATENT DOCUMENTS

| | | |
|---|---|---|
| CN | 107562657 A | 1/2018 |
| JP | H05197619 A | 8/1993 |
| JP | H10269167 A | 10/1998 |
| KR | 100687996 B1 | 2/2007 |
| KR | 20130049150 A | 5/2013 |
| KR | 101609718 B1 | 4/2016 |

OTHER PUBLICATIONS

Office Action for Chinese Application No. 201811393074.0, dated Nov. 30, 2020, 22 pages.
Office Action for Japanese Application No. 2019-197271, dated Nov. 4, 2020, 8 pages.
Office Action for Korean Application No. 10-2019-0135665, dated Feb. 22, 2021, 10 pages.

* cited by examiner

METHOD, APPARATUS, DEVICE AND STORAGE MEDIUM FOR ACCESSING STATIC RANDOM ACCESS MEMORY

CROSS REFERENCE TO RELATED APPLICATION

This application claims priority under 35 U.S.C. § 119(a) on Chinese Patent Application No. 201811393074.0, filed with the State Intellectual Property Office of P. R. China on Nov. 21, 2018, the entire contents of which are incorporated herein by reference.

TECHNICAL FIELD

The present disclosure relates to a field of integrated circuit, and more particularly, to a method, an apparatus, a device and a computer readable storage medium for accessing static random access memories (SRAMs).

BACKGROUND

Integrated circuit devices have been widely used in various aspects of daily work and life. The integrated circuit devices include, for example, a field programmable gate array (FPGA), a system on a chip (SOC), an application specific integrated circuit (ASIC) device, and the like. In designs of the FPGA, SOC, and ASIC circuit chip, SRAMs are widely used to store data required for calculations or to buffer results of the calculations. In general, an SRAM memory space may be accessed by independent access devices, such as computing units. However, the SRAM has only one read/write port. In this case, different access devices may conflict on reading from and writing to the SRAM. Upon arbitration, typically only one access device may access the SRAM, while other computing units must wait.

To solve a defect of read-once-write-once of the SRAM, various solutions have been proposed in the industry. However, those solutions usually require redesign of the SRAM at a circuit level, resulting in an inner structure much more complex than a conventional single-port read-once-write-once SRAM and multiplied logics such as those for address control. In addition, in terms of circuit area, as the number of ports increases, the area is also multiplied. Additionally, due to the complicated inner structure, operating efficiency of the SRAM may be decreased. Therefore, the conventional read-many write-many SRAM is expensive and has low operating efficiency.

SUMMARY

Exemplary embodiments according to the present disclosure provide solutions for accessing the SRAMs.

According to a first aspect of the present disclosure, a method for accessing static random access memories, comprising: receiving an access request for data associated with the static random access memories; writing a plurality of sections of the data into a plurality of different static random access memories in an interleaved manner in response to the access request being a write request for the data, each of the plurality of sections having its respective predetermined size; and reading the plurality of sections of the data from the plurality of static random access memories in an interleaved manner in response to the access request being a read request for the data, each of the plurality of sections having its respective predetermined size.

According to a second aspect of the present disclosure, an apparatus for accessing static random access memories, comprising: a receiving module, configured to receive an access request for data associated with static random access memories; and an access module, configured to: write a plurality of sections of the data into a plurality of different static random access memories in an interleaved manner in response to the access request being a write request for the data, each of the plurality of sections having a predetermined size; and read the plurality of sections of the data from the plurality of static random access memories in an interleaved manner in response to the access request being a read request for the data, each of the plurality of sections having a predetermined size.

According to a third aspect of the present disclosure, an electronic device is provided. The electronic device includes one or more processors; and a storage device, configured to store one or more programs, wherein, when the one or more programs are executed by the one or more processors, the one or more processors are configured to implement a method according to the first aspect of the present disclosure.

According to a fourth aspect of the present disclosure, a computer readable storage medium having a computer program stored thereon, wherein, when a program is executed by a processor, the program implements a method according to the first aspect of the present disclosure.

It should be understood that the summary is not intended to limit key or critical features of the embodiments of the present disclosure, nor is it intended to be used to limit the scope of the present disclosure. Other features of the present disclosure will become apparent from the following description.

BRIEF DESCRIPTION OF THE DRAWINGS

The above and other features, advantages and aspects of the embodiments of the present disclosure will become more apparent with reference to the accompanying drawings and the following detailed description. In the drawings, like or similar reference numbers indicate like or similar elements.

DETAILED DESCRIPTION

Figure 1:
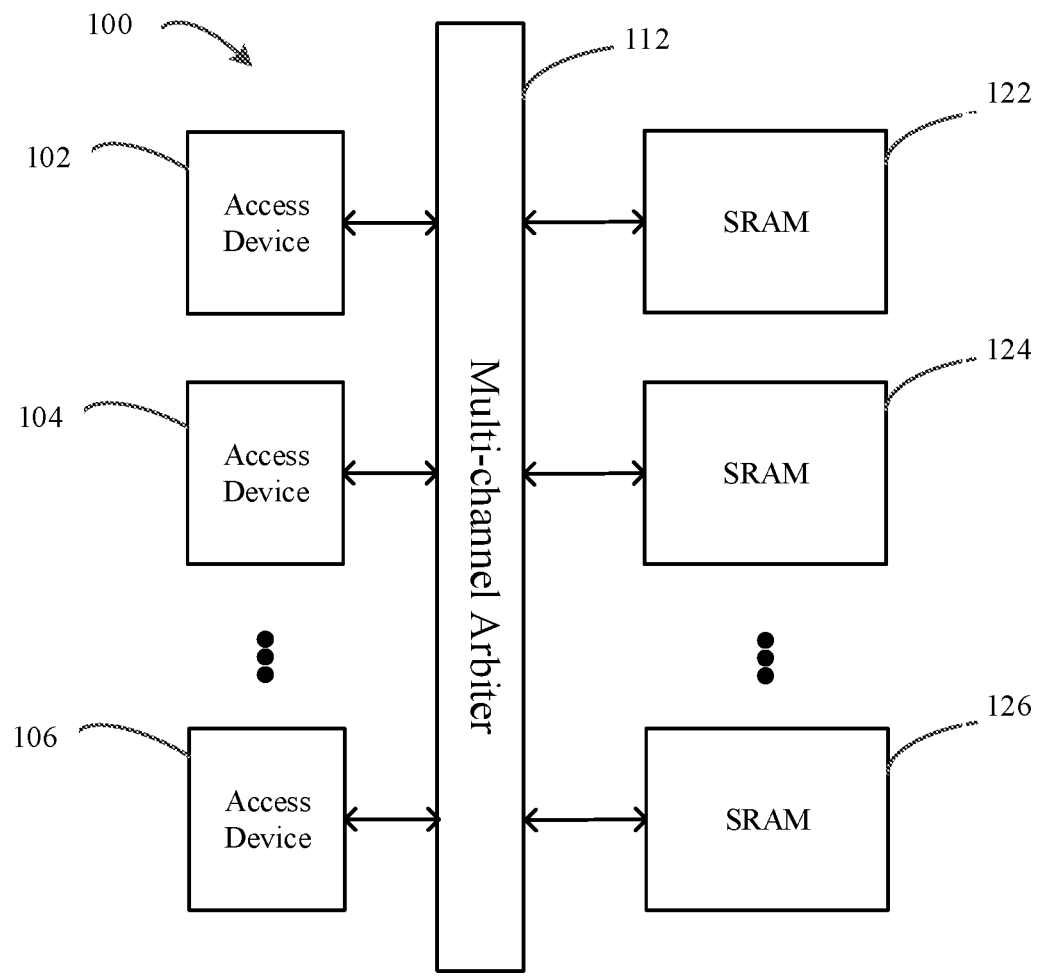
FIG. 1 is a schematic diagram showing an exemplary environment in which embodiments of the present disclosure may be implemented.

Embodiments of the present disclosure will be described in more detail below with reference to the accompanying drawings. While some embodiments of the present disclosure have been illustrated in the accompanying drawings, it is to be understood that the present disclosure may be embodied in various forms and should not be construed as limited to the embodiments set forth herein; instead, these embodiments are provided so that the present disclosure will be understood thoroughly and completely. It should be understood that the drawings and embodiments of the present disclosure are for illustrative purposes only and are not intended to limit the scope of the present disclosure.

In the description of the embodiments of the present disclosure, the term "include" and its equivalents should be construed as open-ended inclusions, i.e., "including, but not limited to". The term "based on" should be understood as "at least partially based on". The term "one embodiment" or "the embodiment" should be understood as "at least one embodiment". Terms "first," "second," and the like may refer to different or identical objects. Other explicit and implicit definitions may also be included below.

Generally, an electronic device may include SRAM(s) having a certain capacity according to design requirements. For example, the electronic device may include a 256 KB SRAM. In conventional solutions, a single 256 KB SRAM may be used for implementation.

As described above, in conventional solutions, the SRAM is typically a single-port SRAM, which may only implement read-once-write-once operations. Even with a multi-port SRAM, it is necessary to redesign the SPRM at circuit level, which decrease operating efficiency.

According to an embodiment of the present disclosure, there is provided a read-many write-many SRAM solution that may be implemented by using an SRAM group including a plurality of SRAMs without redesigning the SRAM itself at the circuit level. Additionally, the SRAM solution according to the embodiment of the present disclosure may improve the read-write efficiency of the SRAM.

For example, an electronic device requiring a 256 KB SRAM may be implemented with two 128 KB SRAMs, or four 64 KB SRAMs, or one 128 KB SRAM and two 64 KB SRAMs. By using a plurality of SRAMs, the access efficiency of the access device may be improved, which will be described in detail below.

Embodiments of the present disclosure will be described in detail below with reference to the accompanying drawings. FIG. 1 is a schematic diagram of an exemplary environment 100 in which embodiments of the present disclosure may be implemented. As shown, the exemplary environment 100 includes a plurality of access devices which may access a plurality of SRAMs through an electronic device, such as a multi-channel arbiter, to implement read-many write-many operations on the SRAMs. The access device may be, for example, a central processor, a digital signal processor, or the like. It may be understood that the multi-channel arbiter is merely an example and that other electronics or circuits may be used to implement the electronic device.

At least one of the plurality of access devices 102, 104, . . . , 106 may send a data access request to the multi-channel arbiter 112 during one access period. Here, access refers to reading or writing. For example, the access device refers to a device capable of writing/reading data to/from the SRAM through the multi-channel arbiter 112; the access period refers to a read period or a write period for the SRAM; and the data access request refers to a request for writing/reading data to/from the SRAM.

When there is only one access request during one access period, the multi-channel arbiter 112 may read/write data from/to a plurality of SRAMs according to the access request. When there are a plurality of access requests during one access period, the multi-channel arbiter 112 may determine access objects based on the plurality of access requests.

In a case where the access objects do not conflict with each other, the plurality of SRAMs may be accessed in parallel during the access period. For example, when the access device 102 intends to read from the SRAM 122 and the access device 104 intends to write into the SRAM 124 during one access period, the multi-channel arbiter 112 may perform a read operation on the SRAM 122 and a write operation on the SRAM 124.

In a case where the access objects conflict with each other, the SRAM may be accessed according to priorities during the access period. For example, when both the access devices 102 and 104 require reading from the SRAM 122 during one access period, the multi-channel arbiter 112 may perform a read operation on the SRAM 122 according to a predetermined priorities. For example, when the access device 102 has a higher priority, the multi-channel arbiter 112 may read data required by the access device 102 and postpone reading data required by the access device 104. Then, during the next access period, the data required by the access device 102 is located in the SRAM 124. At this point, SRAMs 122 and 124 may be read in parallel during this access period.

Figure 2:
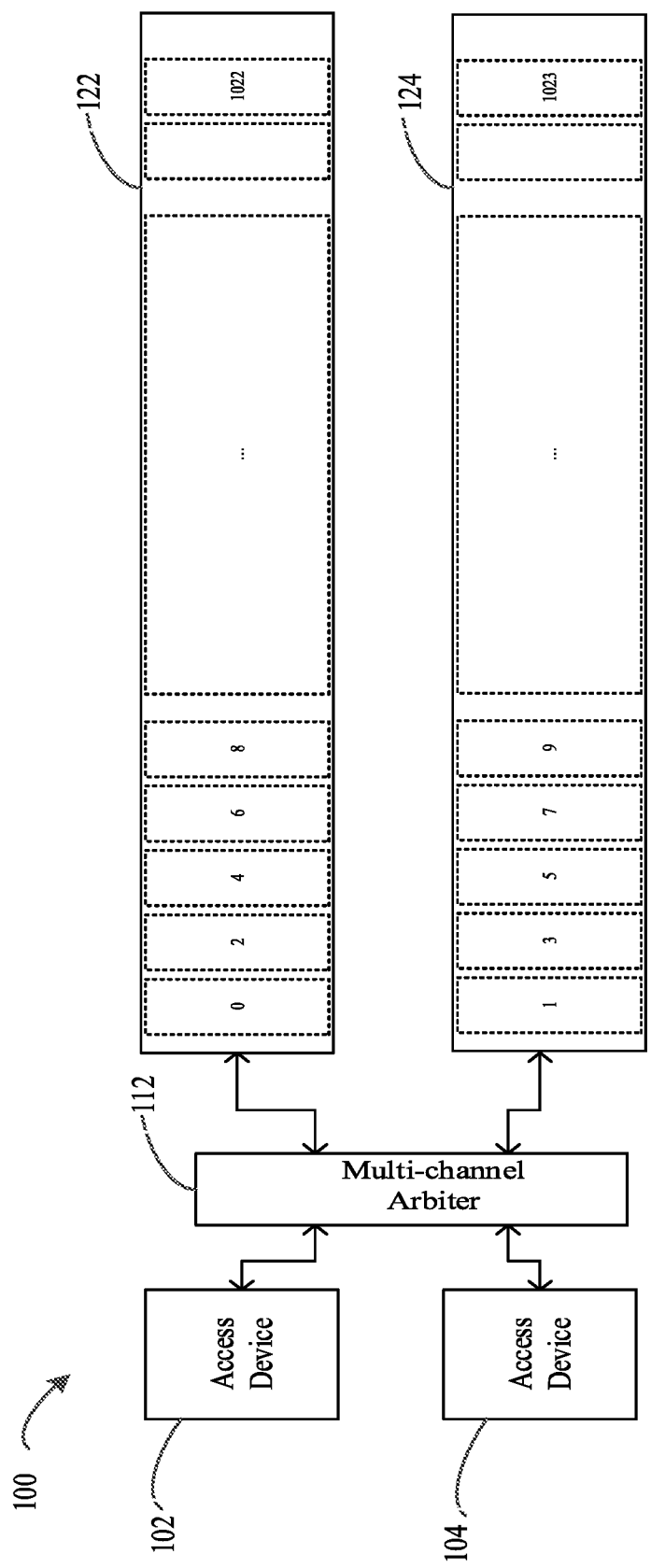
FIG. 2 is a schematic block diagram showing a dual-read dual-write SRAM according to an embodiment of the present disclosure.

Hereinafter, further detailed description will be made in combination with FIG. 2. FIG. 2 is a schematic block diagram of a dual-read dual-write SRAM device according to an embodiment of the present disclosure. The SRAM device includes a first SRAM 122 and a second SRAM 124. The first SRAM 122 and the second SRAM 124 have the same capacity; for example, each having 512 memory cells. The memory cells in the first SRAM 122 are indicated by even numbers, and the memory cells in the second SRAM 124 are indicated by odd numbers.

Researches by the inventor show that data is generally stored in an SRAM in a continuous manner. Therefore, it is possible to enable the access devices to access the SRAMs 122 and 124 in an interleaved manner by constituting a single SRAM through interleaved two SRAMs 122 and 124, thereby increasing the probability of accessing the SRAMs 122 and 124 in parallel in a case of a plurality of access devices and improving the access efficiency.

For example, first data may be sequentially stored in the memory cell 0 in the first SRAM 122, the memory cell 1 in the second SRAM 124, the memory cell 2 in the first SRAM 122, the memory cell 3 in the second SRAM 124, . . . , and the memory cell 9 in the second SRAM 124. Second data may be sequentially stored in a storage unit 410 in the first SRAM 122, the storage unit 411 in the second SRAM 124, the storage unit 412 in the first SRAM 122, the storage unit 413 in the second SRAM 124, . . . , and the storage unit 419 in the second SRAM 124.

For example, in the case where the first access device 102 needs to write the first data into the memory cells 0-9 and the second access device 102 needs to write the second data into the memory cells 410-419, during a first access (write) period, a first section of the first data needs to be written into the memory cell 0 in the first SRAM 122 and a first section of the second data needs to be written into the memory cell 410 in the first SRAM 122, resulting in an access conflict. This is because the first SRAM 122 has only one port and could only response to one access request.

In this case, the multi-channel arbiter 112 may arbitrate according to the priorities. For example, when the first access device 102 has a higher priority than that of the second access device 104, the multi-channel arbiter 112 may write the first section of the first data into the memory cell 0 and postpones the writing of the first section of the second data until the next access period.

During the next access period, the multi-channel arbiter 112 determines that a second section of the first data from the first access device 102 is to be written into the memory cell 1 in the second SRAM 124 and the first section of the second data from the second access device 104 is to be written into the memory cell 410 in the first SRAM 122. In this case, there is no access conflict. Consequently, the multi-channel arbiter 112 performs parallel writing for the memory cell 410 in the first SRAM 122 and the memory cell 1 in the second SRAM 124.

During the next access period, the multi-channel arbiter 112 performs the parallel writing for the memory cell 411 and the memory cell 412. And so on, no data conflict would occur until all of the first data and the second data has been written completely.

It can be seen that, except for the first access period in which two access devices conflict with each other, no access conflict occurs in the rest periods. The reading/writing efficiency of the first access device 102 from/to the SRAM is 100%, while the reading/writing efficiency of the first access device 104 from/to the SRAM is 10/11=91%. In contrast, when the SRAM device is constructed with a conventional single SRAM, the efficiency of each computing unit is only 50%. In summary, M computing units may access the SRAM simultaneously with less or no mutual interference. There is no limitation on the relationship between M and N. In other words, M may be less than, equal to, or greater than N. Generally, increasing the number of N may reduce the probability of conflicts.

In the above example, the multi-channel arbiter 112 determines a destination address according to the access request from the access device. Then, the multi-channel arbiter 112 may determine target addresses corresponding to respective sections of the first data based on the destination addresses and a predetermined address mapping relationship. For example, a storage depth of the SRAM device including the first SRAM 122 and the second SRAM 124 is 1024. Accordingly, 10 bits are required for representing the target address. For example, the target address of the memory cell 0 is 0000000000 and the target address of the memory cell 1 is 0000000001.

In the above example, the last bit is used to determine the SRAM to be accessed. For example, when the last bit is 0, the first SRAM 122 is to be accessed. When the last bit is 1, the second SRAM 124 is to be accessed. In fact, any two bits of the address may be used for arbitration.

For example, in a case where one SRAM device is composed of 4 SRAMs, arbitration may be performed using the 0th bit and the 4th bit of the target address. {address[4], address[0]} represents a 2-bit binary number formed by extracting and combining the 4th bit and the 0th bit of the target address. The arbitration logic of the multi-channel arbiter 112 may be represented as: accessing the first SRAM if {address [4], address [0]} is equal to a binary number 00; accessing the second SRAM if {address [4], address [0]} is equal to a binary number 01; accessing the third SRAM if {address [4], address [0]} is equal to a binary number 10; and accessing the fourth SRAM if {address [4], address [0]} is equal to a binary number 11. However, the present disclosure is not limited thereto. One or more bits at different bit positions in the address may be selected for arbitration with respect to different applications.

Although FIG. 2 illustrates two SRAMs, the present disclosure is not limited thereto. For example, more SRAMs may be used to construct an interleaved storage SRAM device. For example, in a case where three SRAMs are used to construct the interleaved storage SRAM device, the data may be sequentially written into the three SRAMs in an interleaved manner. In some embodiments, the configuration of the SRAM device may be dynamically arranged. For example, in response to a new SRAM being added or an SRAM being removed, the interleaved manner may be adjusted dynamically.

Further, although in the example of FIG. 2, the capacities of the first SRAM 122 and the second SRAM 124 are identical, the capacities of the first SRAM 122 and the second SRAM 124 may be different. For example, the first SRAM 122 may have 512 memory cells, and the second SRAM 124 may have 1024 memory cells. In this case, the first SRAM 122 and the second SRAM 124 may be accessed in an interleaved manner by sequentially accessing one memory cell in the first SRAM 122, then accessing two memory cells in the second SRAM 124, then accessing one memory cell in the first SRAM 122, and then accessing two memory cells in the second SRAM 124. In other words, each of the data sections to be written into the plurality of SRAMs may have its respective predetermined size that is determined based on the capacities of the plurality of SRAMs.

Although in the example of FIG. 2, the first access device 102 has a higher priority, the present disclosure is not limited thereto. In some other examples, the second access device 104 may have a fixed higher priority. Alternatively, the priorities of the first access device 102 and the second access device 104 may be alternate. For example, when a first conflict occurs, the first access device 102 may have a higher priority. When a second conflict occurs, the second access device 104 may have a higher priority, and so on. Further, in some cases, a weighted alternate priority pattern may be provided. For example, the priorities may be presented in an order of the first access device 102, the second access device 104, the second access device 104, the first access device 102, the second access device 104, the second access device 104, and so on.

It is to be understood that although a variety of priority patterns has been described, the present disclosure is not limited thereto. The priority pattern may be adjusted dynamically. For example, the priority pattern may be adjusted from the fixed priority pattern to the alternate priority pattern or to the weighted alternate priority pattern.

Although an SRAM that is read and written through a single port has been described in the example of FIG. 2, the present disclosure is not limited thereto. For example, the SRAM may be a single-port SRAM, a pseudo-dual-port SRAM, a dual-port SRAM or a multiple-port SRAM, or a combination thereof. Further, although operations for writing data have been described in the example of FIG. 2, the present disclosure is not limited thereto. In the example of FIG. 2, the access operation may be operations for reading data. For example, in the example of FIG. 2, the first access device 102 and the second access device 104 may read data from the first SRAM 122 and the second SRAM 124 in an interleaved manner. In another example, the first access device 102 may write data into the first SRAM 122 and the second SRAM 124 in an interleaved manner, and the second access device 104 may read data from the first SRAM 122 and the second SRAM 124 in an interleaved manner.

Figure 3:
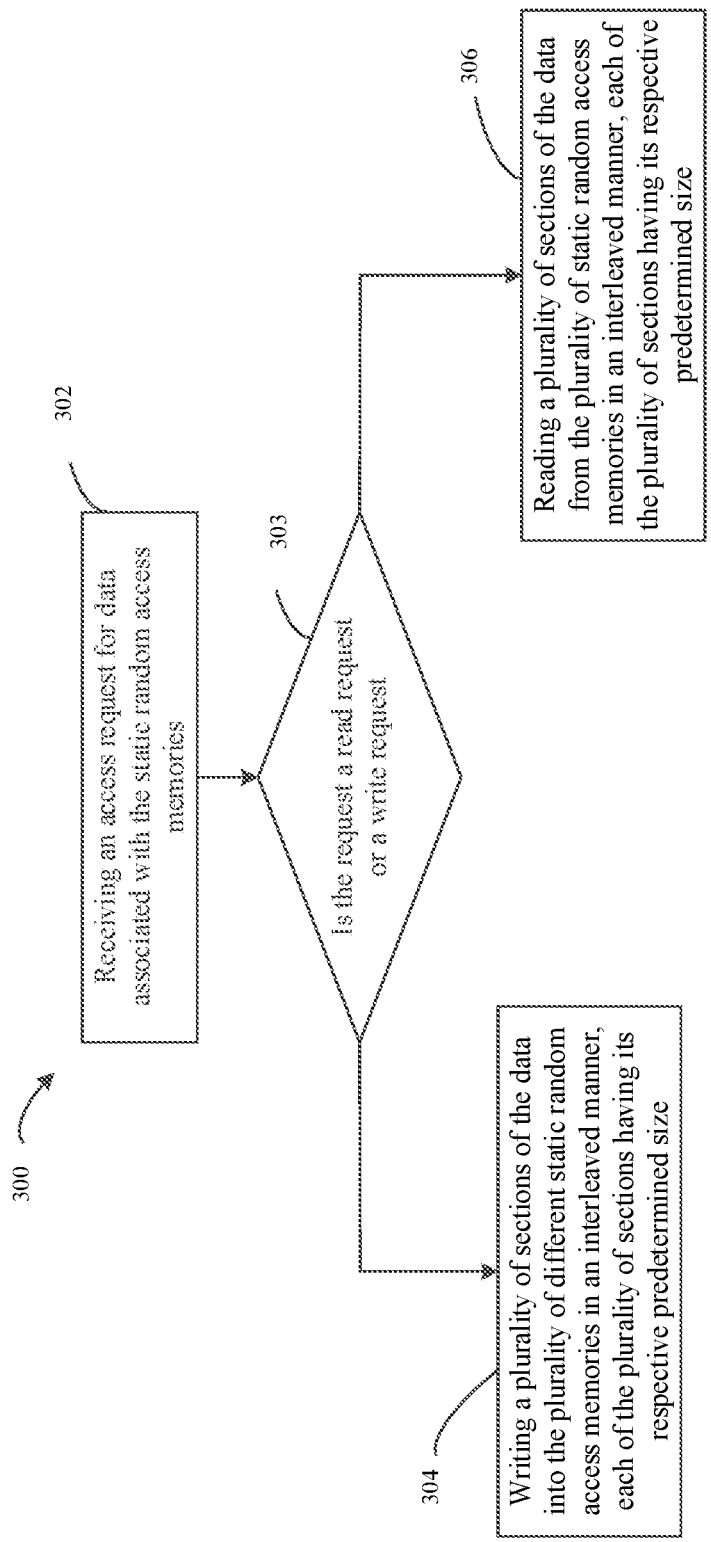
FIG. 3 is a flow chart showing a method for accessing an SRAM according to an embodiment of the present disclosure.

FIG. 3 is a flow chart showing a method 300 for accessing static random access memories (SRAMs) according to an embodiment of the present disclosure. For example, the method 300 may be performed by the multi-channel arbiter 112 in the environment as illustrated in FIG. 1. It should be understood that the method 300 may include additional blocks not shown and/or may omit some illustrated blocks. The present disclosure is not limited thereto.

At block 302, an access request for data associated with the static random access memories is received.

For example, the multi-channel arbiter 112 may receive a first access request from a first access device 102. The first access request may be a request for writing the data into the first SRAM 122 and the second SRAM 124 in an interleaved manner, or may be a request for reading data from the first SRAM 122 and the second SRAM 124 in an interleaved manner. In another example, the multi-channel arbiter 112 may receive the first access request from the first access device 102 and a second access request from a second access device 104. Similar to the above example, the first access request may be a request for reading data or a request for writing data, and the second access request may also be a request for reading data or a request for writing data.

At block 303, it is determined whether the request is a request for writing data or a request for reading data.

At block 304, a plurality of sections of the data is written into the plurality of different static random access memories in an interleaved manner in response to the access request being a write request for the data, each of the plurality of sections having its respective predetermined size.

For example, in response to a write request for the data that is sent from the first access device 102, the multi-channel arbiter 112 may write a first section of a first data into the first SRAM 122, a second section of the first data into the second SRAM 124, a third section of the first data into the first SRAM 122, a fourth section of the first data into the second SRAM 124, and so on, until all of the first data has been written completely.

At block 306, the plurality of sections of the data is read from the plurality of static random access memories in an interleaved manner in response to the access request being a read request for the data, each of the plurality of sections having its respective predetermined size.

For example, in response to a read request for the data that is sent from the first access device 102, the multi-channel arbiter 112 may read the first section of the first data from the first SRAM 122, the second section of the first data from the second SRAM 124, the third section of the first data from the first SRAM 122, the fourth section of the first data from the second SRAM 124, and so on, until all of the first data has been read completely.

Each section of the first data may have its respective predetermined size, for example, 1 bit or 2 bits. Each section of the first data may have the same or different predetermined size. For example, the first section may be of 1 bit, the second may be of 2 bits, the third section may be of 1 bit, the fourth section may be of 2 bits, and so on.

Figure 4:
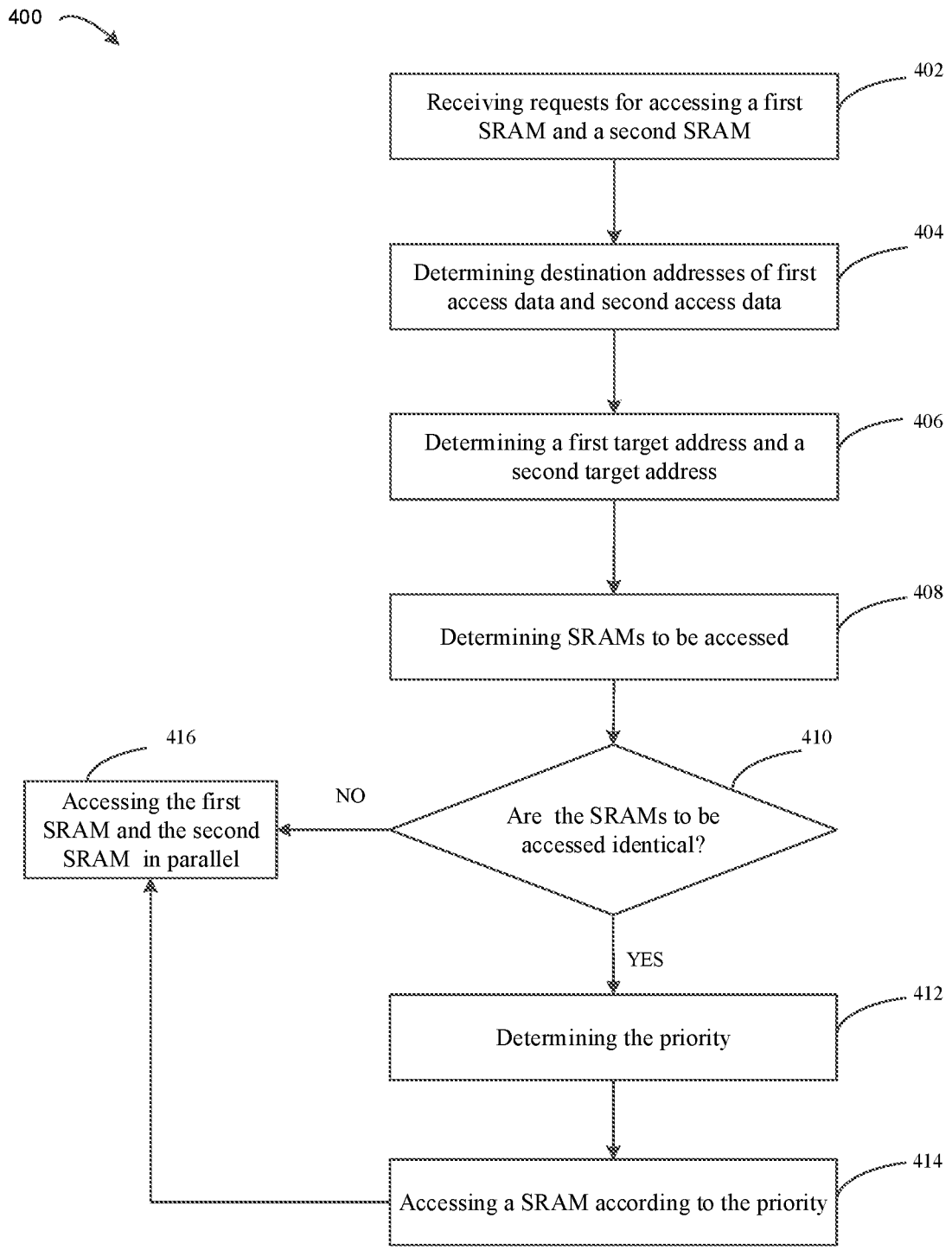
FIG. 4 is a specific flow chart showing a method for accessing SRAMs according to an embodiment of the present disclosure.

FIG. 4 is a specific flow chart of a method 400 for accessing the SRAMs according to an embodiment of the present disclosure. For example, the method 400 may be performed in the environment as illustrated in FIG. 1. It should be understood that method 400 may include additional blocks not shown and/or may omit some illustrated blocks. The present disclosure is not limited thereto.

At block 402, the multi-channel arbiter 112 receives a first request for accessing the first SRAM and a second request for accessing the second SRAM. The first request may be, for example, a request from the first access device for reading or writing the first data, and the second request may be a request from the second access device for reading or writing the second data.

At block 404, the multi-channel arbiter 112 determines a destination address of first access data and a destination address of second access data. The destination address may be a logical address of the data, such as a logical address contained in the request.

At block 406, the multi-channel arbiter 112 may determine a target address of a section of the data to be written during an access period based on the destination address and a predetermined address mapping relationship.

For example, the multi-channel arbiter 112 may determine the target address of the first section of the first data, e.g., "0000000000", and the target address of the first section of the second data, e.g., "0000100110", based on the logical addresses of those data and the address mapping relationship.

At block 408, the multi-channel arbiter 112 may determine the SRAM to be accessed during the access period based on the target address.

For example, the multi-channel arbiter 112 may determine that both the first section and the second section of the first data require access to the first SRAM 122 based on the last bit in "0000000000" and "0000100110".

At block 410, the multi-channel arbiter 112 may determine whether the SRAMs to be accessed are identical based on the access object determined at the block 408.

At block 416, the multi-channel arbiter 112 may access the first SRAM 122 and the second SRAM 124 in parallel when there is no conflict between the objects to be accessed.

For example, during the access period, the first section of the first data is written into the first SRAM 122, and the first section of the second data is read from the second SRAM 124. In the next access period, the second section of the first data is written into the second SRAM 124, the second section of the second data is read from the first SRAM 122, and so on, until all of the first data has been written completely and all of the second data has been read completely.

At block 412, the multi-channel arbiter 112 may determine a current priority of each access device when there is a conflict between the objects to be accessed.

For example, the multi-channel arbiter 112 may determine that the priority of the first access device 102 is higher in the current access period according to one of a fixed priority strategy, an alternate priority strategy, or a weighted priority strategy.

At block 414, the multi-channel arbiter 112 accesses a corresponding SRAM according to the priority determined at block 412.

For example, in this access period, the first section of the first data from the first access device 102 is written into the first SRAM 122, and an operation of reading data from the first SRAM 122 by the second access device 104 is postponed to the next access period.

Then, during the next access period, the multi-channel arbiter 112 repeats the operations at blocks 406, 408, and 410. Here, since it is determined at block 210 that the SRAMs to be accessed are different, the method 400 proceeds to block 216. The multi-channel arbiter 112 accesses the first SRAM 122 and the second SRAM 124 in parallel. For example, during the access period, the first section of the first data is written into the first SRAM 122, and the first section of the second data is read from the second SRAM 124. Then, during the next access period, the second section of the first data is written into the second SRAM 124, the second section of the second data is read from the first SRAM 122, and so on, until all of the first data has been written completely and all of the second data has been read completely.

From the above description, it can be seen that embodiments of the present disclosure construct a single "virtual" SRAM device with the plurality of SRAMs, and access the plurality of SRAMs in an interleaved manner. In this way, the embodiments of the present disclosure may construct an SRAM device having a read-many write-many function at low cost without redesigning the circuits for the SRAM, and may greatly improves access efficiency to the SRAM device in the case of a plurality of access devices.

Figure 5:
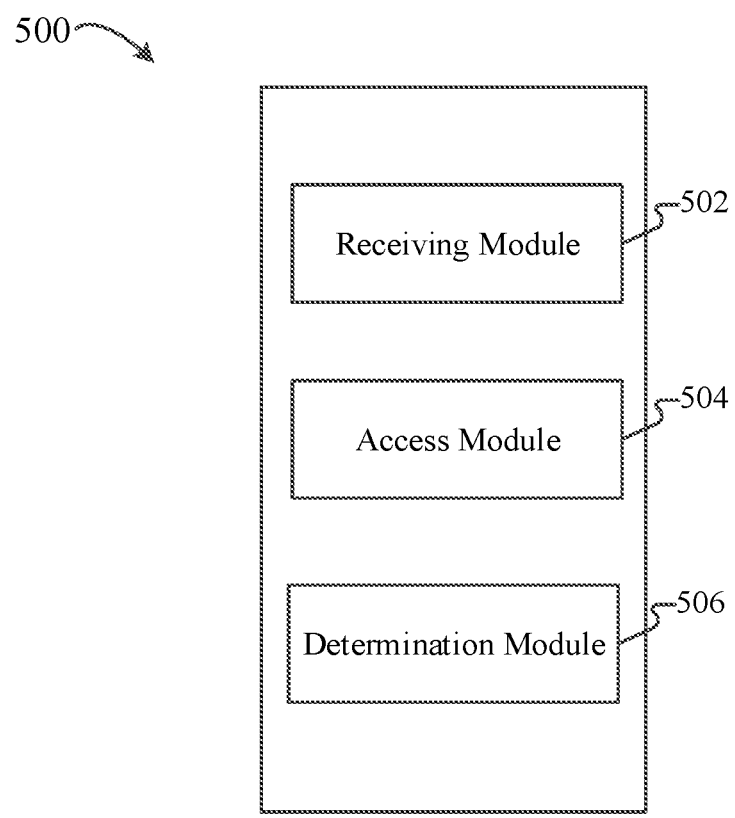
FIG. 5 is a block diagram showing an apparatus for accessing SRAMs according to an embodiment of the present disclosure.

The embodiments of the present disclosure further provide a corresponding device for implementing the above method or process. FIG. 5 is a schematic block diagram showing an apparatus 500 for accessing the static random access memories according to an embodiment of the present disclosure. The apparatus 500 may be implemented in the environment as illustrated in FIG. 1. As illustrated in FIG. 5, the apparatus 500 may include a receiving module 502, an access module 504, and a determination module 506.

In some embodiments, the receiving module 502 is configured to receive an access request for data associated with static random access memories. The access module 504 is configured to write a plurality of sections of the data into a plurality of static random access memories in an interleaved manner in response to the access request being the write request for the data, each of the plurality of sections having a predetermined size; and to read the plurality of sections of the data from the plurality of static random access memories in an interleaved manner in response to the access request being the read request for the data.

In some embodiments, the predetermined size of the plurality of sections is determined based on the capacities of the plurality of static random access memories.

In some embodiments, the received access request is a first request from a first access device for writing the data as first data. The receiving module 502 includes a receiving unit configured to receive the second request from the second access device for writing second data into the plurality of static random access memories. The access module includes a first writing unit configured to write the plurality of sections of the second data into the plurality of static random access memories in an interleaved manner, which is in parallel with writing the plurality of sections of the first data in an interleaved manner.

In some embodiments, the apparatus 500 further includes the determination module 506. The determination module 506 is configured to determine a first object into which a first section of the plurality of sections of the first data is to be written and a second object into which the second section of the plurality of sections of the second data is to be written during a write period, each of the first object and the second object being one of the plurality of static random access memories.

The access module 504 includes: a second writing unit. The second writing unit is configured to write the first section into the first object and the second section into the second object in parallel in response to the first object being different from the second object; and to write one of the first section and the second section into the first object in response to the first object being identical to the second object.

In some embodiments, the determination module 506 includes a priority determination unit. The priority determination unit is configured to determine priorities of the first access device and the second access device. The access module 504 includes a third writing unit. The third writing unit is configured to, in response to the priority of the second access device being higher than the priority of the first access device, write the second section into the first object, and to postpone writing the first section into the first object until the next write period.

In some embodiments, the received access request is a first request from the first access device for reading the data as first data. The receiving module 502 includes a receiving unit. The receiving unit is configured to receive a second request from a second access device for reading second data from the plurality of static random access memories. The access module 504 includes a first reading unit, configured to read the plurality of sections of the second data from the plurality of static random access memories in an interleaved manner, which is in parallel with reading the plurality of sections of the first data in an interleaved manner.

In some embodiments, the apparatus 500 further includes the determination module 506. The determination module 506 is configured to determine a first object from which a first section of the plurality of sections of the first data is to be read and the second object from which a second section of the plurality of sections of the second data is to be read during a read period, each of the first object and the second object being one of the plurality of static random access memories. The access module 504 includes a second reading unit. The second reading unit is configured to read the first section from the first object and the second section from the second object in parallel in response to the first object being different from the second object; and to read one of the first section and the second section from the first object in response to the first object being identical to the second object.

In some embodiments, the determination module 506 further includes a priority determination unit. The priority determination unit is configured to determine priorities of the first access device and the second access device. The access module 504 includes a third reading unit. The third reading unit is configured to, in response to the priority of the second access device being higher than the priority of the first access device, read the second section from the first object, and postpone reading the first section from the first object until the next read period.

In some embodiments, the determination module 506 includes a memory determination unit. The memory determination unit is configured to determine a destination address for accessing the first data from the first request; determine a target address corresponding to the first section of the first data based on the destination address and a predetermined address mapping relationship; and determine static random access memories corresponding to the first section based on at least a portion of the target address.

The units illustrated in FIG. 5 may be implemented in part or in whole as hardware modules, software modules, firmware modules, or any combination thereof. In particular, in some embodiments, the above-described flows, methods, or processes may be implemented by hardware in a storage system, a host corresponding to the storage system or other computing devices independent of the storage system.

Figure 6:
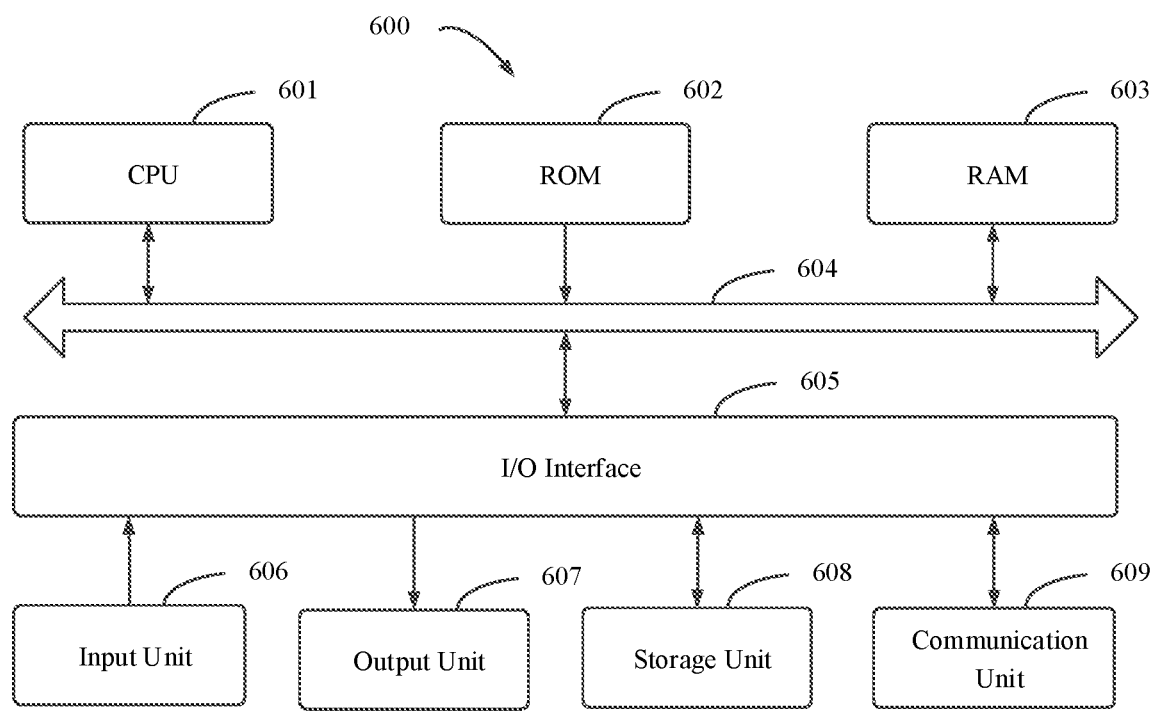
FIG. 6 is a block diagram of a computing device for implementing embodiments of the present disclosure.

FIG. 6 is a schematic block diagram of an example device 600 for implementing embodiments of the present disclosure. The device 600 may be configured to implement a training data extension device 110 and/or a model training device 140 as described in FIG. 1. As illustrated in the figure, the device 600 includes a central processing unit (CPU) 601, which may perform various suitable actions and processes in accordance with computer program instructions stored in a read only memory (ROM) 602 or loaded from a storage unit 608 into a random access memory (RAM) 603. In the RAM 603, various programs and data necessary for operations of the device 600 may also be stored. The CPU 601, the ROM 602, and the RAM 603 are connected to each other through a bus 604. An input/output (I/O) interface 605 is also connected to the bus 604.

A number of components in the device 600 are connected to the I/O interface 605, including: an input unit 606 such as a keyboard, a mouse, and the like; an output unit 607 such as various types of displays, speakers, etc.; the storage unit 608 such as a magnetic disk, an optical disk, or the like; and a communication unit 609 such as a network card, a modem, a wireless communication transceiver, and so on. The communication unit 609 allows the device 600 to exchange information/data with other devices via a computer network such as the Internet and/or various telecommunications networks.

The processing unit 601 performs the various methods and processes described above, such as the method 400. For example, in some embodiments, the method 400 may be implemented as a computer software program tangibly embodied on a machine-readable medium, such as the storage unit 608. In some embodiments, some or all of the computer programs may be loaded and/or installed onto the device 600 via the ROM 602 and/or the communication unit 609. When a computer program is loaded onto the RAM 603 and executed by the CPU 601, one or more steps in the method 400 described above may be performed. Alternatively, in other embodiments, the CPU 601 may be configured to perform the method 400 in any other suitable manner (e.g., by way of the firmware).

The functions described herein above may be performed, at least in part, by one or more hardware logic components. For example, and without limitation, exemplary types of the hardware logic components that may be used include: a field programmable gate array (FPGA), an application specific integrated circuit (ASIC), an application specific standard product (ASSP), a system on chip (SOC), a complex programmable logic device (CPLD), and the like.

Program codes for performing the method in the present disclosure may be written in any combination of one or more programming languages. These program codes may be provided to a processor or controller in a general purpose computer, a special purpose computer, or other programmable data processing devices, such that the program codes, when executed by the processor or controller, are configured to implement functions/operations specified in the flow chart and/or block diagrams. The program code may be executed entirely on a machine, partly on the machine, as a separate software package, partly on the machine, partly on a remote computer, or entirely on the remote computer or server.

In the context of the present disclosure, the machine-readable medium may be a tangible medium that may contain, or store a program for use by or in combination with an instruction execution system, an apparatus, or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include: an electrical connection having one or more wires, a portable computer disk, a hard disk, a random access memory (RAM), a read only memory (ROM), an Erasable Programmable Read Only Memory (EPROM or a flash memory), an optical fiber, a compact disc read-only memory (CD-ROM), an optical memory component, a magnetic memory component, or any suitable combination thereof.

Moreover, while operations are described in a particular order, this should be understood as that the operations are required to be performed in a particular illustrated order or in a sequential order, or that all illustrated operations are required to be performed to achieve desirable results. In certain circumstances, multitasking and parallel processing may be advantageous. Likewise, while several specific implementation details are included in the above discussion, these should not be construed as limiting the scope of the present disclosure. Certain features described in the context of separate embodiments may also be implemented in combination in a single implementation. Conversely, features that are described in the context of the single implementation may also be implemented in a plurality of implementations separately or in any suitable sub-combination.

Although the subject matter has been described in a language specific to structural features and/or methodological acts, it is to be understood that the subject matter defined in the attached claims is not necessarily limited to the specific features or acts described above. Instead, the specific features and acts described above are merely exemplary forms for implementing the attached claims.

What is claimed is:

1. A method for accessing static random access memories, comprising:
    receiving an access request for data associated with the static random access memories;
    writing a plurality of sections of the data into a plurality of different static random access memories in an interleaved manner in response to the access request being a write request for the data, each of the plurality of sections having its respective predetermined size;
    reading the plurality of sections of the data from the plurality of static random access memories in an interleaved manner in response to the access request being a read request for the data, each of the plurality of sections having its respective predetermined size;
    wherein the received access request is a first request from a first access device for writing the data as first data, and the method further comprises:
    receiving a second request from a second access device for writing second data into the plurality of static random access memories; and
    writing the plurality of sections of the second data into the plurality of static random access memories in an interleaved manner, which is in parallel with the writing of the plurality of sections of the first data in an interleaved manner.

2. The method according to claim 1, wherein the predetermined size of the plurality of sections is determined based on capacities of the plurality of static random access memories.

3. The method according to claim 1, wherein writing the plurality of sections of the second data into the plurality of static random access memories in an interleaved manner comprises:
    determining a first object into which a first section of the plurality of sections of the first data is to be written and a second object into which a second section of the plurality of sections of the second data is to be written during a write period, each of the first object and the second object being one of the plurality of static random access memories;
    writing the first section into the first object and the second section into the second object in parallel in response to the first object being different from the second object; and writing one of the first section and the second section into the first object in response to the first object being identical to the second object.

4. The method according to claim 3, wherein writing one of the first section and the second section into the first object comprises:
   determining priorities of the first access device and the second access device; and
   in response to the priority of the second access device being higher than the priority of the first access device, writing the second section into the first object, and
   postponing writing the first section into the first object until the next write period.

5. The method according to claim 1, wherein the received access request is a first request from a first access device for reading the data as first data, and the method further comprises:
   receiving a second request from a second access device for reading second data from the plurality of static random access memories; and
   reading the plurality of sections of the second data from the plurality of static random access memories in an interleaved manner, which is in parallel with the reading of the plurality of sections of the first data in an interleaved manner.

6. The method according to claim 5, wherein reading the plurality of sections of the second data from the plurality of static random access memories in an interleaved manner comprises:
   determining a first object from which a first section of the plurality of sections of the first data is to be read and the second object from which a second section of the plurality of sections of the second data is to be read during a read period, each of the first object and the second object being one of the plurality of static random access memories;
   reading the first section from the first object and the second section from the second object in parallel in response to the first object being different from the second object; and
   reading one of the first section and the second section from the first object in response to the first object being identical to the second object.

7. The method according to claim 6, wherein reading one of the first section and the second section from the first object comprises:
   determining priorities of the first access device and the second access device; and
   in response to the priority of the second access device being higher than the priority of the first access device, reading the second section from the first object, and
   postponing reading the first section from the first object until the next read period.

8. The method according to claim 3, wherein determining the first object comprises:
   determining a destination address for accessing the first data from the first request;
   determining a target address corresponding to the first section of the first data based on the destination address and a predetermined address mapping relationship; and
   determining static random access memories corresponding to the first section based on at least a portion of the target address.

9. An apparatus for accessing static random access memories, comprising:
   one or more processors; and
   a storage device, configured to store one or more programs, wherein, when the one or more programs are executed by the one or more processors, the one or more processors are configured to implement a method for accessing static random access memories, comprising:
   receiving an access request for data associated with the static random access memories;
   writing a plurality of sections of the data into a plurality of different static random access memories in an interleaved manner in response to the access request being a write request for the data, each of the plurality of sections having its respective predetermined size;
   reading the plurality of sections of the data from the plurality of static random access memories in an interleaved manner in response to the access request being a read request for the data, each of the plurality of sections having its respective predetermined size;
   wherein the received access request is a first request from a first access device for writing the data as first data, and
   the one or more processors are further configured to:
   receive a second request from a second access device for writing second data into the plurality of static random access memories; and
   write the plurality of sections of the second data into the plurality of static random access memories in an interleaved manner, which is in parallel with writing the plurality of sections of the first data in an interleaved manner.

10. The apparatus according to claim 9, wherein the predetermined size of the plurality of sections is determined based on capacities of the plurality of static random access memories.

11. The apparatus according to claim 9, when the one or more processors are configured to write the plurality of sections of the second data into the plurality of static random access memories in an interleaved manner, the one or more processors are further configured to:
   determine a first object into which a first section of the plurality of sections of the first data is to be written and a second object into which a second section of the plurality of sections of the second data is to be written during a write period, each of the first object and the second object being one of the plurality of static random access memories;
   write the first section into the first object and the second section into the second object in parallel in response to the first object being different from the second object; and
   write one of the first section and the second section into the first object in response to the first object being identical to the second object.

12. The apparatus according to claim 11, wherein when the one or more processors are configured to write one of the first section and the second section into the first object, the one or more processors are further configured to:
   determine priorities of the first access device and the second access device; and
   in response to the priority of the second access device being higher than the priority of the first access device, write the second section into the first object, and
   postpone writing the first section into the first object until the next write period.

13. The apparatus according to claim 9, wherein the received access request is a first request from a first access device for reading the data as first data, the one or more processors are further configured to:
receive a second request from a second access device for reading second data from the plurality of static random access memories; and
read the plurality of sections of the second data from the plurality of static random access memories in an interleaved manner, which is in parallel with the reading of the plurality of sections of the first data in an interleaved manner.

14. The apparatus according to claim 13, when the one or more processors are configured to read the plurality of sections of the second data from the plurality of static random access memories in an interleaved manner, the one or more processors are further configured to:
determine a first object from which a first section of the plurality of sections of the first data is to be read and the second object from which a second section of the plurality of sections of the second data is to be read during a read period, each of the first object and the second object being one of the plurality of static random access memories;
read the first section from the first object and the second section from the second object in parallel in response to the first object being different from the second object; and
read one of the first section and the second section from the first object in response to the first object being identical to the second object.

15. The apparatus according to claim 14, wherein when the one or more processors are configured to read one of the first section and the second section from the first object, the one or more processors are further configured to:
determine priorities of the first access device and the second access device; and
in response to the priority of the second access device being higher than the priority of the first access device, read the second section from the first object, and postpone reading the first section from the first object until the next read period.

16. The apparatus according to claim 11, wherein when the one or more processors are configured to determine the first object, the one or more processors are further configured to:
determine a destination address for accessing the first data from the first request;
determine a target address corresponding to the first section of the first data based on the destination address and a predetermined address mapping relationship; and
determine static random access memories corresponding to the first section based on at least a portion of the target address.

17. A non-transitory computer readable storage medium having a computer program stored thereon, wherein, when a program is executed by a processor, the program implements a method for accessing static random access memories, comprising:
receiving an access request for data associated with the static random access memories;
writing a plurality of sections of the data into a plurality of different static random access memories in an interleaved manner in response to the access request being a write request for the data, each of the plurality of sections having its respective predetermined size;
reading the plurality of sections of the data from the plurality of static random access memories in an interleaved manner in response to the access request being a read request for the data, each of the plurality of sections having its respective predetermined size;
wherein the received access request is a first request from a first access device for writing the data as first data, and the method further comprises:
receiving a second request from a second access device for writing second data into the plurality of static random access memories; and
writing the plurality of sections of the second data into the plurality of static random access memories in an interleaved manner, which is in parallel with the writing of the plurality of sections of the first data in an interleaved manner.

18. The non-transitory computer readable storage medium according to claim 17, further comprising:
receiving a second request from a second access device for reading second data from the plurality of static random access memories; and
reading the plurality of sections of the second data from the plurality of static random access memories in an interleaved manner, which is in parallel with the reading of the plurality of sections of the first data in an interleaved manner.

* * * * *

UNITED STATES PATENT AND TRADEMARK OFFICE
CERTIFICATE OF CORRECTION

| | |
|---|---|
| PATENT NO. | : 11,093,388 B2 |
| APPLICATION NO. | : 16/682868 |
| DATED | : August 17, 2021 |
| INVENTOR(S) | : Xiaozhang Gong and Jing Wang |

Page 1 of 1

It is certified that error appears in the above-identified patent and that said Letters Patent is hereby corrected as shown below:

On the Title Page

Item (30), Foreign Application Priority Data:
Nov. 21, 2018 (CN)................20181139074.0

Should read:
Nov. 21, 2018 (CN) ................201811393074.0

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*